US011169546B2

(12) United States Patent
Wakikawa (10) Patent No.: US 11,169,546 B2
(45) Date of Patent: Nov. 9, 2021

(54) CONTROL DEVICE, PROGRAM, AND CONTROL METHOD

(71) Applicant: HAPSMobile Inc., Tokyo (JP)

(72) Inventor: Ryuji Wakikawa, Tokyo (JP)

(73) Assignee: HAPSMobile Inc., Tokyo (JP)

(*) Notice: Subject to any disclaimer, the term of this patent is extended or adjusted under 35 U.S.C. 154(b) by 0 days.

(21) Appl. No.: 17/096,913

(22) Filed: Nov. 12, 2020

(65) Prior Publication Data

US 2021/0064063 A1 Mar. 4, 2021

Related U.S. Application Data

(63) Continuation of application No. PCT/JP2019/029240, filed on Jul. 25, 2019.

(30) Foreign Application Priority Data

Aug. 27, 2018 (JP) .............................. JP2018-157914

(51) Int. Cl.
*G05D 1/10* (2006.01)
*H04W 4/40* (2018.01)
(Continued)

(52) U.S. Cl.
CPC .............. *G05D 1/104* (2013.01); *B60L 8/003* (2013.01); *B60L 50/60* (2019.02); *B60L 58/12* (2019.02);
(Continued)

(58) Field of Classification Search
CPC ........ G05D 1/104; H02J 7/35; H02J 7/00032; B64D 27/24; B64D 2211/00; B60L 8/003;
(Continued)

(56) References Cited

U.S. PATENT DOCUMENTS 9,948,380 B1 4/2018 Vos
10,034,209 B1 * 7/2018 Nandan .............. H04B 7/18504
(Continued)

FOREIGN PATENT DOCUMENTS

JP 2002211496 A 7/2002
JP 2016531797 A 10/2016
KR 101564254 B1 10/2015

OTHER PUBLICATIONS

Decision to Grant a Patent issued for counterpart Japanese Application No. 2018-157914, issued by the Japanese Patent Office dated Mar. 3, 2020 (drafted on Feb. 27, 2020).

*Primary Examiner* — Muhammad Shafi (57) ABSTRACT

There is provided a control device, configured to control a plurality of flight objects having a solar panel, a battery for storing an electrical power generated by the solar panel, and an antenna for forming a communication area on a ground with the electrical power stored in the battery and providing a wireless communication service for a user terminal within the communication area, the control device comprising: a flight object selecting unit configured to select a to-be-replaced active flight object among a plurality of active flight objects, which are flight objects each flying while covering a target area with the communication area; and a replacement controlling unit configured to replace the to-be-replaced active flight object with a standby flight object, which is a flight object flying without forming the communication area.

22 Claims, 9 Drawing Sheets

(51) Int. Cl.
*B60L 50/60* (2019.01)
*B60L 58/12* (2019.01)
*H02J 7/00* (2006.01)
*B60L 8/00* (2006.01)
*B64C 1/36* (2006.01)
*B64D 27/24* (2006.01)
*H02J 7/35* (2006.01)

(52) U.S. Cl.
CPC ................ *B64C 1/36* (2013.01); *B64D 27/24* (2013.01); *H02J 7/00032* (2020.01); *H02J 7/35* (2013.01); *H04W 4/40* (2018.02); *B60L 2200/10* (2013.01); *B64D 2211/00* (2013.01)

(58) Field of Classification Search
CPC ...... B60L 50/60; B60L 58/12; B60L 2200/10; H04W 4/40; B64C 1/36
USPC .......................................................... 701/3
See application file for complete search history.

(56) References Cited

U.S. PATENT DOCUMENTS

| | | | |
|---|---|---|---|
| 10,259,332 B2 | 4/2019 | Lin | |
| 2015/0379874 A1* | 12/2015 | Ubhi | .................. B60L 8/003 701/3 |
| 2016/0156406 A1* | 6/2016 | Frolov | .................. H04W 16/28 455/431 |

* cited by examiner

CONTROL DEVICE, PROGRAM, AND CONTROL METHOD

The contents of the following Japanese and PCT applications are incorporated herein by reference:
NO. 2018-157914 filed in JP on Aug. 27, 2018, and
NO. PCT/JP2019/029240 filed in WO on Jul. 25, 2019.

BACKGROUND

1. Technical Field

The present invention relates to a control device, a program, and a control method.

2. Related Art

There is known a flight object which has an antenna and flies in the stratosphere in order to provide a stratospheric platform (for example, see Patent document 1).

PRIOR ART DOCUMENT

Patent Document

[Patent document 1] Japanese Unexamined Patent Application Publication No. 2002-211496

Problems to be Solved

There is a demand for providing a technique which is able to appropriately help a flight object to provide a wireless communication service.

DESCRIPTION OF EXEMPLARY EMBODIMENTS

Hereinafter, the present invention will be described through embodiments of the invention, but the following embodiments are not intended to limit the invention of the claims. Also, all combinations of features described in the embodiments are not necessarily essential to solutions of the invention.

Figure 1:
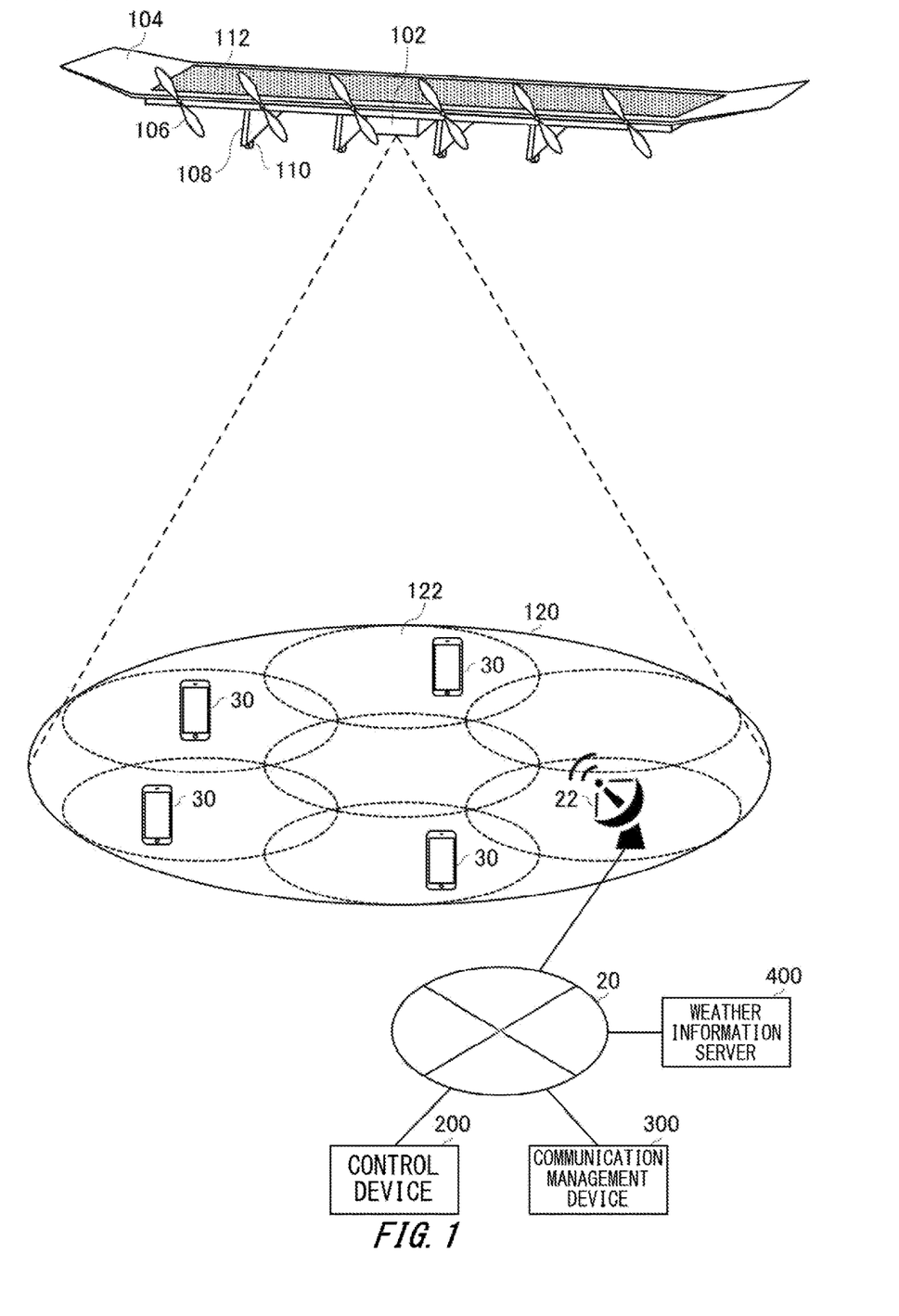
FIG. 1 is a schematic diagram of one example of a flight object 100.

FIG. 1 is a schematic diagram of one example of a flight object 100. The flight object 100 includes a body portion 102 and a main wing portion 104. The body portion 102 has a propeller 106, a skid 108, and a wheel 110. The main wing portion 104 has a solar panel 112.

The body portion 102 includes a battery and an antenna, which are not shown. The electrical power generated by the solar panel 112 is stored in the battery. The flight object 100 can fly by rotating the propeller 106 with the electrical power stored in the battery. In addition, the flight object 100 forms a communication area 120 on the ground using the antenna and provides a wireless communication service for a user terminal 30 within the communication area 120. The antenna may be, for example, a multibeam antenna and the communication area 120 may be composed of a plurality of cells 122. The flight object 100 provides the wireless communication service for the user terminal 30 on the ground by, for example, flying in the stratosphere. The flight object 100 may function as a stratospheric platform.

The user terminal 30 may be any terminal as long as it is a communicate terminal which can communicate with the flight object 100. For example, the user terminal 30 is a mobile phone such as a smartphone. The user terminal 30 may be a tablet terminal, a PC (Personal Computer), and the like.

The flight object 100 provides the wireless communication service for the user terminal 30 by, for example, relaying the communication between the user terminal 30 and a network 20 on the ground. The network 20 may include a core network provided by a telecommunications operator. The network 20 may also include the Internet.

The flight object 100 may communicate with the network 20 via a gateway 22 within the communication area 120, among the gateways 22 deployed at various places on the ground. The flight object 100 may also communicate with the network 20 via, for example, a communications satellite, which is not shown.

The flight object 100 transmits, to the network 20, data which is, for example, received from the user terminal 30 within the communication area 120. When the flight object 100 receives the data addressed to the user terminal 30 within the communication area 120 via, for example, the network 20, it also transmits the data to the user terminal 30.

The flight object 100 may be controlled by a control device 200. The flight object 100 flies according to, for example, the instruction transmitted by the control device 200. The control device 200 may transmit the instruction to the flight object 100 via the gateway 22 and the network 20. The control device 200 may also transmit the instruction to the flight object 100 via a communications satellite.

The control device 200 controls a plurality of flight objects 100 such that each the plurality of flight objects 100 covers a target area on the ground with the communication area 120 thereof.

For example, the control device 200 assigns a different target area to each of the plurality of flight objects 100 so that each of the plurality of flight objects 100 covers each target area. Each of the plurality of flight objects 100 may cover each target area by circling in the sky above each target area. The circling in the sky above a target area is sometimes referred to as a fixed point flight. Each target area may be separated with each other or may be adjacent to each other. Each of the plurality of flight objects 100 may cover each part of a large target area so that the large target area is covered.

The control device 200 may also, for example, assign one target area for the plurality of flight objects 100 and control the plurality of flight objects 100 such that the communication area 120 of each of the plurality of flight objects 100 covers a part of the target area while moving relative to the target area and the plurality of communication areas 120 of the plurality of flight objects 100 covers the entire target area.

The control device 200 may control the plurality of flight objects 100 based on the communication information such as the communication traffic of the wireless communication service provided by the plurality of flight objects 100 for the user terminal 30. The control device 200 may receive the communication information from a communication management device 300, which manages the communication of the plurality of user terminals 30. The communication management device 300 is arranged in, for example, the core network of a telecommunications operator and manages the communication of the plurality of user terminals 30.

The control device 200 may also control the plurality of flight objects 100 based on the weather information of the flight area where each of the plurality of flight objects 100 is flying. The control device 200 may receive the weather information from a weather information server 400, which manages and provides the weather information in each area in the sky.

Figure 2:
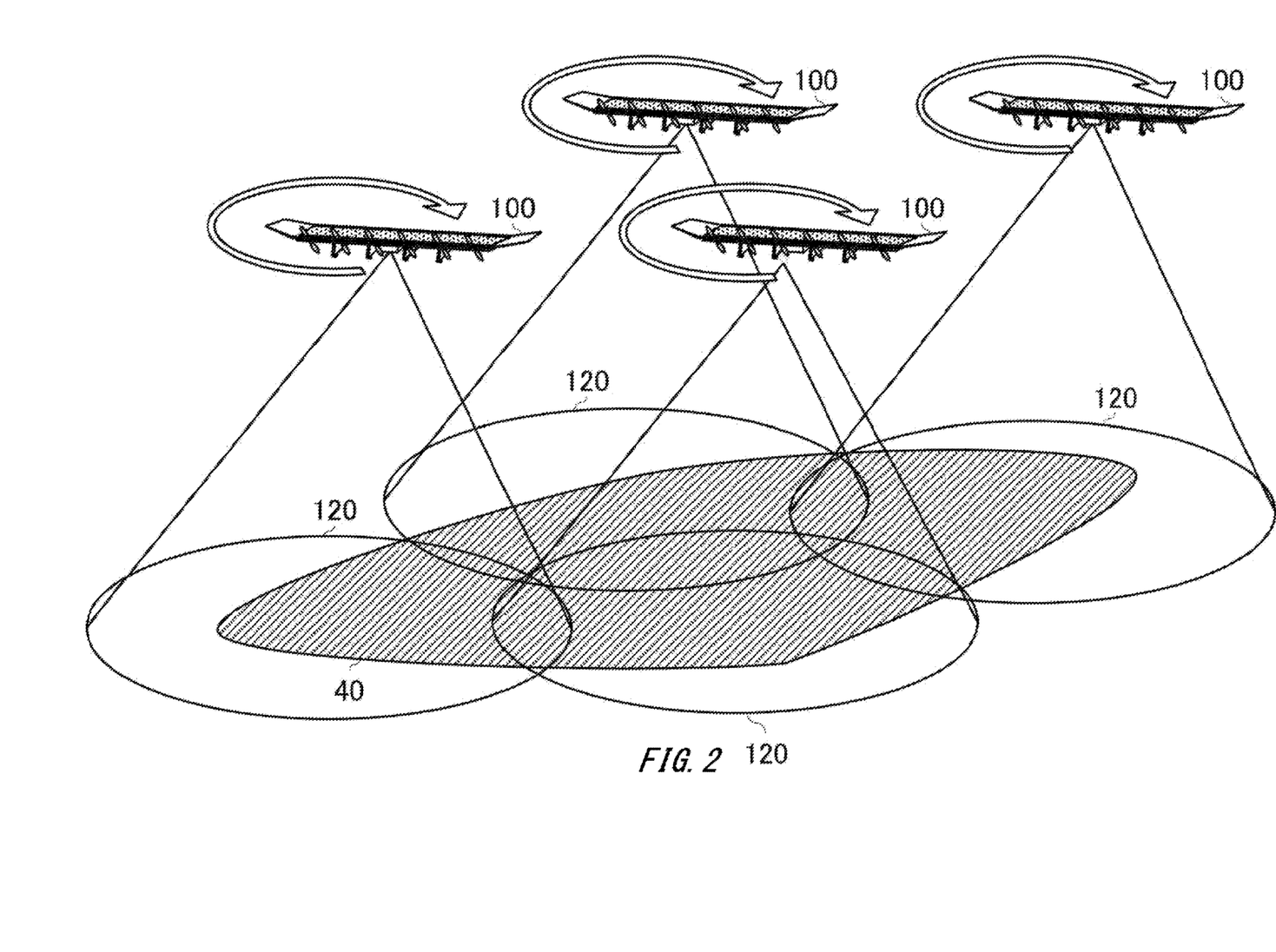
FIG. 2 is a schematic diagram of one example of a flying mode of a plurality of flight objects 100.

FIG. 2 is a schematic diagram of one example of the flying mode of the plurality of flight objects 100. FIG. 2 exemplifies the situation in which each of the plurality of flight objects 100 covers each section of the target area 40 by performing the fixed point flight in the sky above the target area 40 so that the entire target area 40 is covered.

Figure 3:
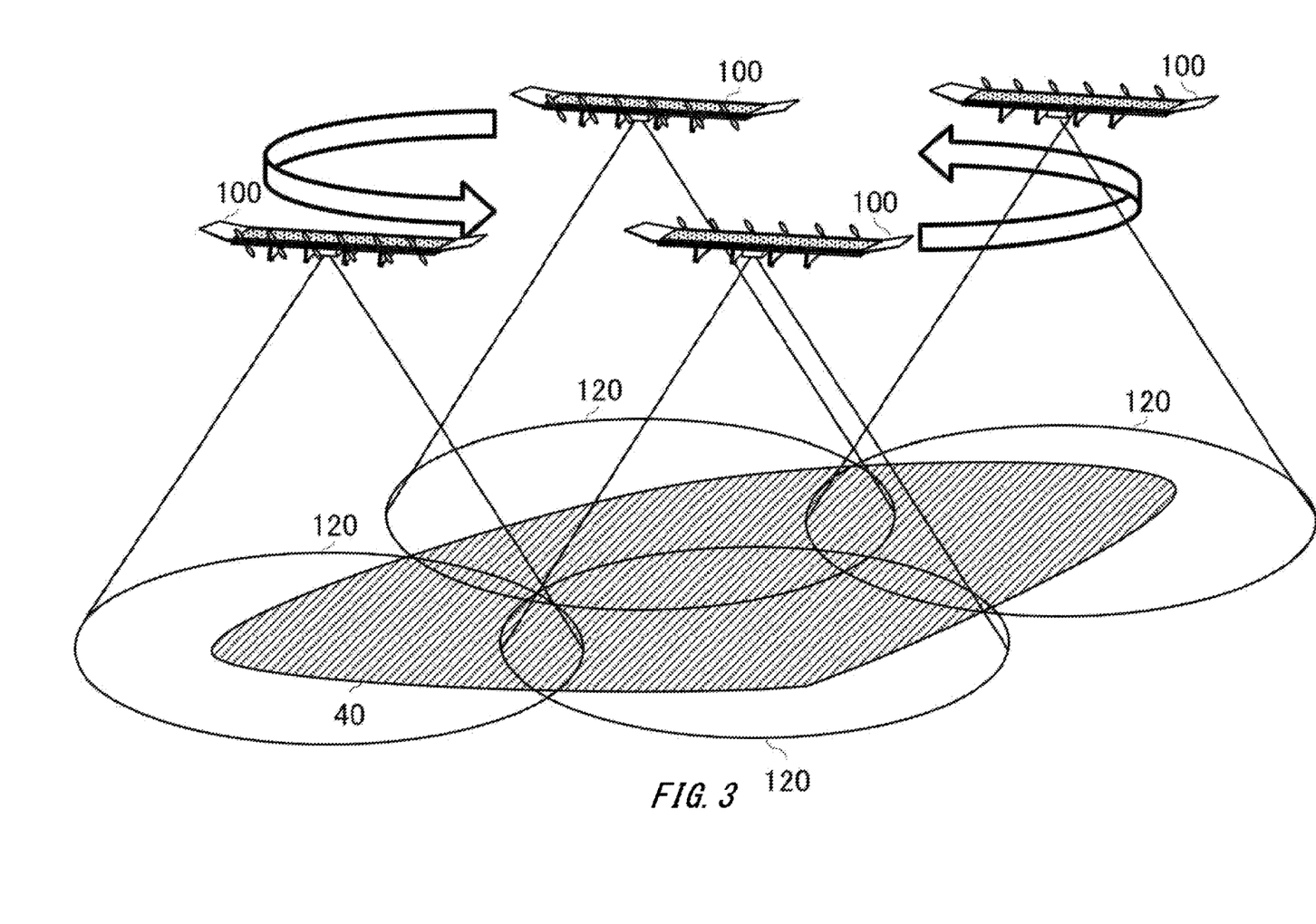
FIG. 3 is a schematic diagram of one example of a flying mode of a plurality of flight objects 100.

FIG. 3 is a schematic diagram of one example of the flying mode of the plurality of flight objects 100. FIG. 3 exemplifies the situation in which each of the plurality of flight objects 100 covers a part of the target area 40 while moving relative to the target area 40 so that the plurality of communication areas 120 of the plurality of flight objects 100 covers the entire target area 40.

In the flying mode exemplified in FIG. 2 and FIG. 3, even if the plurality of flight objects 100 has the same configuration and starts covering the target area 40 at the same time, the battery consumption and the charge amount of each of the plurality of flight objects 100 may be different. The battery consumptions and the charge amounts vary, due to, for example, the difference in the weather, altitude and sunshine of the flight area where the flight object 100 performs the fixed point flight. As a specific example, the battery consumption is larger in the flight area with a higher wind speed. The battery consumption also tends to be larger at a higher altitude, where the air density is lower and thus more electrical power is needed for flying. In addition, the charge amount is larger in the flight area with a higher amount of sunshine. Even if the plurality of flight objects 100 flies along the same path as shown in FIG. 3, the battery consumptions and the charge amounts may vary due to the possible temporal difference in the weather, sunshine, and the like in the area where each of the plurality of flight objects 100 flies.

The battery consumptions also vary due to, for example, the difference in the amount of communication traffic in the wireless communication service provided by the flight object 100 for the user terminal 30. The battery consumption increases as the communication traffic increases, due to the higher amount of electrical power used for the communication. For example, in the case that the communication areas 120 of each of the plurality of flight objects 100 have different sizes, the battery consumptions also vary depending on the difference in the size. The battery consumption increases as the size of the communication area 120 increases, due to the higher amount of electrical power used to form the communication area 120.

Figure 4:
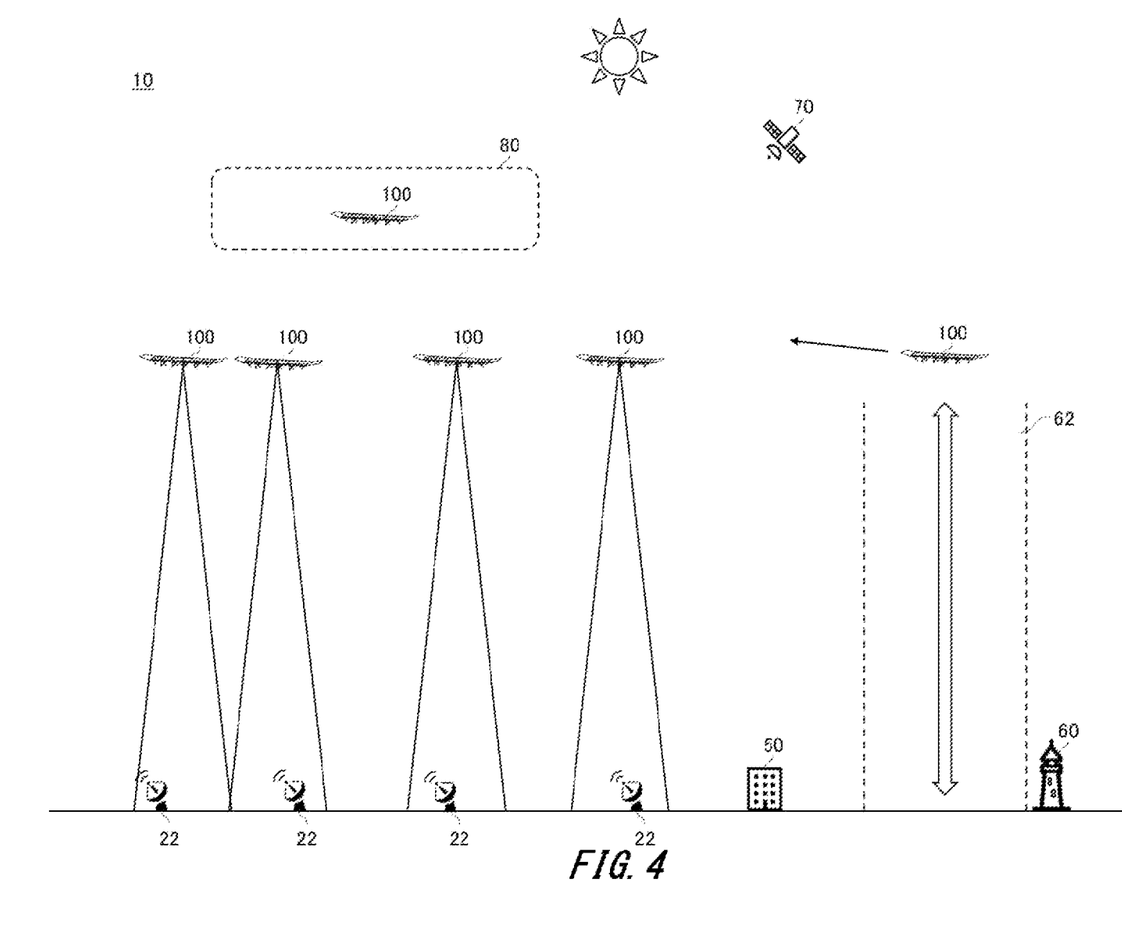
FIG. 4 is a schematic diagram of one example of a constellation system 10.

FIG. 4 is a schematic diagram of one example of a constellation system 10. The constellation system 10 according to the present embodiment includes the plurality of flight objects 100 and the control device 200, which is not shown, arranged in a control facility 50 and controlling the plurality of flight objects 100.

The flight object 100 may move from the ground to the sky under the management of the control tower 60. The flight object 100 reaches the sky by, for example, rising in the management region 62 under the management of the control tower 60. Although the altitude at which the flight object 100 flies may be any altitude, the flight object 100 which functions as the stratospheric platform rises to the stratosphere. Here, an example is mainly described in which the flight object 100 functions as the stratospheric platform.

The flight object 100 which has reached the stratosphere flies in the stratosphere under the control of the control device 200. The control device 200 may cause the flight object 100 to move to the sky above the target area and form the communication area 120 so that the flight object 100 covers the target area. The control device 200 and the flight object 100 may communicate with each other via a communications satellite 70. The control device 200 and the flight object 100 may also communicate with each other via the gateway 22 on the ground. The flight object 100 which flies while covering the target area of the ground with the communication area 120 is sometimes described as an active flight object.

In the constellation system 10 according to the present embodiment, a group of flight objects 100 flies in a standby area 80. The group of the flight objects 100 standbys for replacement with the active flight object, while flying in the standby area 80. Such flight object 100 is sometimes referred to as a standby flight object. The standby flight object may move to the standby area 80 under the control of the control device 200 after it rises from the ground in the management region 62 and reaches the stratosphere. The standby area 80 may be predetermined. The standby area 80 may be fixed or may be variable in location, size, and the like depending on the situation.

The standby flight object is managed such that the battery consumption of the standby flight object is lower than that of the active flight object. For example, the control device 200 prevents the standby flight object from forming the communication area 120. The flight object 100 according to the present embodiment uses electrical power of the battery for each of the flying and the forming of the communication area 120. Among such electrical power consumption, the ratio of the electrical power used to form the communication area 120 is relatively higher. Therefore, when the flight object 100 does not form the communication area 120, the electrical power consumption of the flight object 100 can be reduced by a relatively higher degree.

The standby flight object 100 may also be managed such that the charge amount of the standby flight object 100 is higher than that of the active flight object. For example, the control device 200 causes the standby flight object to fly along the path which increases the amount of light received from the sun. The control device 200 also causes the standby flight object to, for example, tilt its body to increase the amount of light received from the sun. The active flight object has a small amount of acceptable angle of its body, because it needs to cover the target area on the ground with the communication area 120. On the other hand, the standby flight object has a larger amount of acceptable angle of its body than the active flight object, because it does not form the communication area 120. Therefore, the standby flight object can tilt its body with a higher degree than the active flight object. Thus, the solar panel 112 of the standby flight object can receive a larger amount of light than that of the active flight object, and the charge amount of the standby flight object can be higher than that of the active flight object.

The control device 200 according to the present embodiment selects a to-be-replaced active flight object among the plurality of active flight objects and performs a replacement control to replace the to-be-replaced active flight object with a standby flight object. For example, The control device 200 monitors the remaining battery level of the plurality of active flight objects and selects the to-be-replaced active flight object, based on the remaining battery level. For example, the control device 200 identifies an active flight object which would be not able to keep the wireless communication service at the nighttime due to the decreased battery capacity, based on the remaining battery level of the active flight object, the battery capacity which would be consumed until the nighttime, when the solar power generation is not possible, and the battery capacity which would be consumed during the nighttime, and selects the active flight object as the to-be-replaced active flight object.

Figure 5:
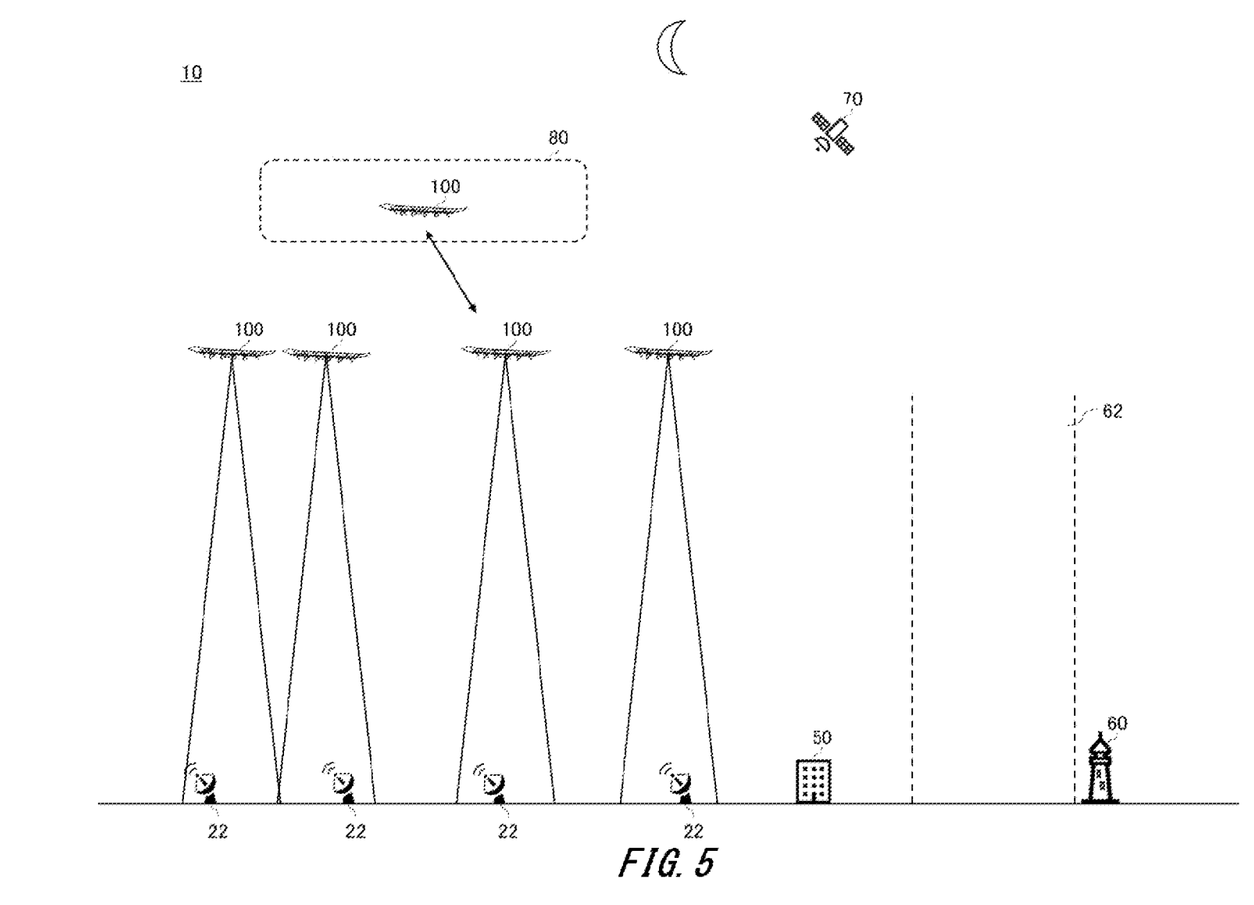
FIG. 5 is an illustration describing a replacement control by a control device 200.

FIG. 5 is an illustration which describes the replacement control of the control device 200. The control device 200 may determine the replacement time period at which the to-be-replaced active flight object is replaced with the standby flight object, and replaces the to-be-replaced active flight object with the standby flight object during the determined replacement time period.

The control device 200 may determine, as the replacement time period, a time period during which the communication traffic of the wireless communication service provided by the active flight object to the user terminal 30 is relatively low. The example of the replacement time period includes the nighttime. Determining such a time period as the replacement time period can reduce the number of the user terminals 30 which are affected by a problem such as a temporary stop of the wireless communication service, a temporary deterioration of the service, and the like, which possibly occur when the active flight object is replaced with the standby flight object.

The control device 200 may cause the standby flight object to move to a flight area whose location corresponds to the flight area of the to-be-replaced active flight object before the replacement time period. For example, the control device 200 causes the standby flight object to move to the flight area whose altitude is higher than that of the flight area of the to-be-replaced active flight object. As a specific example, the control device 200 causes the standby flight object to move to the flight area vertically above the flight area of the to-be-replaced active flight object.

The control device 200 may cause the standby flight object to move toward the to-be-replaced active flight object and replace the active flight object in a flying manner in which the standby flight object uses less electrical power for the flying than the active flight object. For example, the control device 200 causes the standby flight object to move toward the to-be-replaced active flight object in a flying manner in which the time for gliding of the standby flight object is longer than that of the active flight object. This can reduce the amount of electrical power consumed by the standby flight object for replacement, and can replace the active flight object with the standby flight object with the battery fully charged or substantially fully charged.

Figure 6:
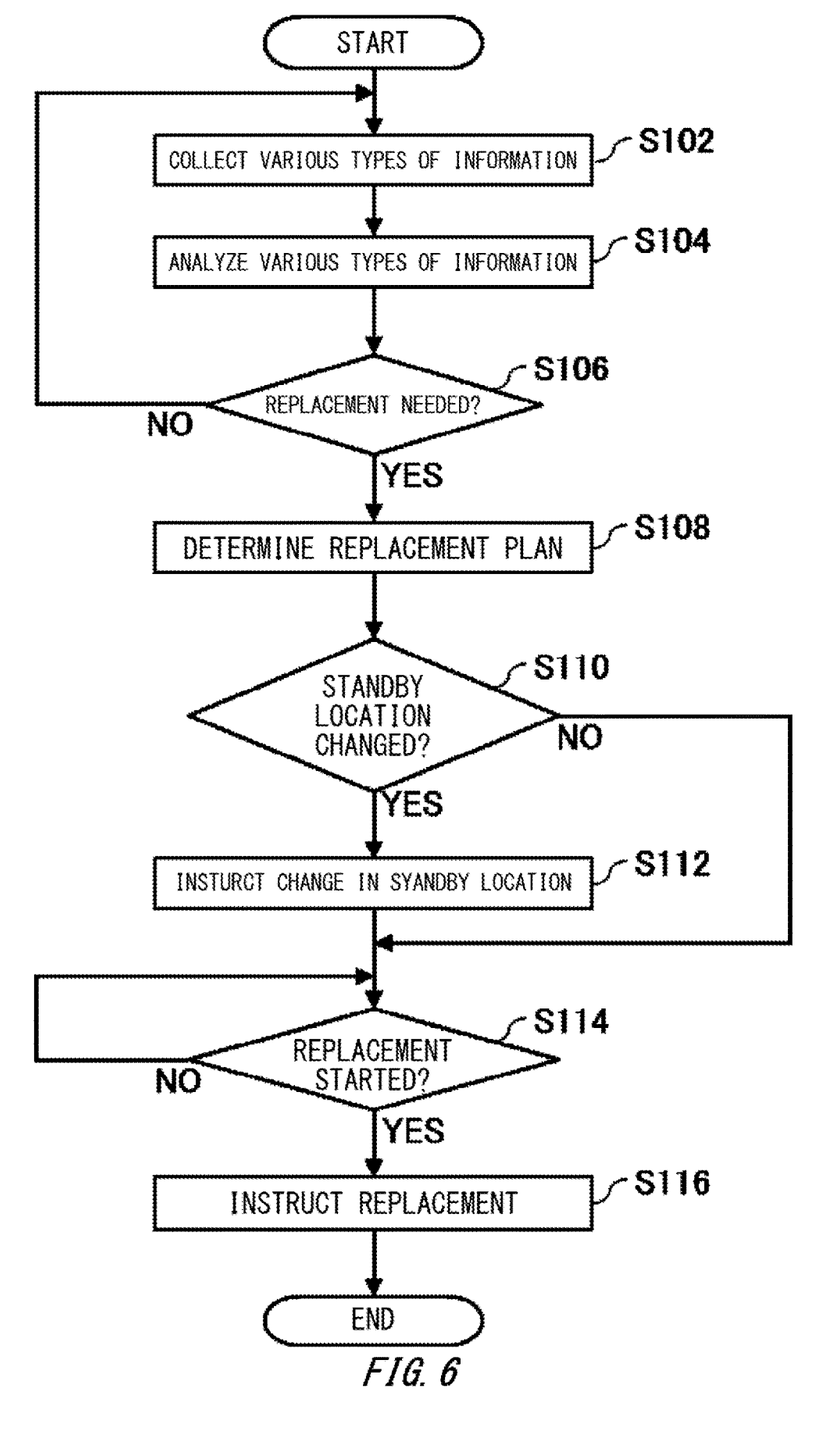
FIG. 6 is a schematic diagram of one example of a flow of the process performed by the control device 200.

FIG. 6 is a schematic diagram of one example of a flow of the process performed by the control device 200. Herein, an example is described in which one standby flight object is flying for the plurality of active flight object. However, the number of the standby flight object is not limited to one, but may be more than one. Each process shown in FIG. 6 is mainly performed by a controlling unit included in the control device 200.

In step 102 (step is sometimes abbreviated as S), the control device 200 collects various types of information. For example, the control device 200 receives battery information indicating the battery condition from each of the plurality of active flight objects. The battery information may include remaining battery level. The battery information may include the electric storage performance of the battery. The control device 200 also receives, for example, from a weather information server 400, the weather information of the flight area in which each of the plurality of active flight objects is flying. The control device 200 also receives, for example, from a communication management device 300, the traffic information indicating the communication traffic in the wireless communication service provided by each of the plurality of active flight objects for the user terminal 30.

In step 104, the control device 200 analyzes various types of information collected in S102. The control device 200 analyzes the various types of information to determine whether there is an active flight object which needs to be replaced among the plurality of active flight objects. The control device 200 determines that there is an active flight object which needs to be replaced, for example, when there is an active flight object whose remaining battery level is lower than a predetermined threshold.

The control device 200 also determines whether there is an active flight object which possibly causes a problem in the provision of the wireless communication service based on, for example, the remaining battery level and at least any of the electric storage performance of the battery, the weather information, and the traffic information. The control device 200 determines that there is an active flight object which needs to be replaced, for example, when there is an active flight object whose remaining battery level is predicted to be lower than a predetermined threshold during the nighttime. When it is determined that there is an active flight object which needs to be replaced, the process proceeds to S108. Otherwise, the process proceeds to S102.

In S108, the control device 200 determines the replacement plan. The control device 200 may determine the replacement plan including the replacement time period and the standby area where the standby flight object flies while it is standbying for replacement.

The control device 200 may also determine the replacement plan further including the treatment of the active flight object after replacement. For example, the control device 200 determines to treat the active flight object after replacement as a standby flight object. In this case, the active flight object after replacement moves to the standby area 80 and prioritizes charging without forming the communication area 120. The control device 200 also determines, for example, to move the active flight object after replacement to the ground. In this case, the active flight object after replacement moves to the management region 62 and then moves to the ground under the management of the control tower 60.

In S110, the control device 200 determines whether the standby position of the standby flight object needs to be changed. The control device 200 determines that the change is not needed, for example, when the standby flight object is already flying in the standby area determined in S108. The control device 200 also determines that the change is needed, for example when the standby flight object is not flying in the standby area determined in S108. It is noted that the control device 200 may also determine that the change is needed, when the distance between the current position of the standby flight object and the current position of the to-be-replaced active flight object is larger than a predetermined threshold. When it is determined that the change is needed, the process proceeds to S112. Otherwise, the process proceeds to S114.

In S112, the control device 200 instructs the standby flight object to change the standby position. The control device 200 instructs the standby flight object, for example, to fly in the standby area determined in S108.

In S114, the control device 200 determines whether to start replacement. For example, when the replacement time period determined in S108 has been reached, the control device 200 determines to start replacement. Otherwise, it determines not to start replacement.

If the control device 200 determines to start replacement, it causes a standby flight object to start moving toward the to-be-replaced active flight object. It is noted that the control device 200 may cause the standby flight object to start moving before the replacement time period is reached so that the standby flight object reaches the location of the to-be-replaced active flight object during the replacement time period. The control device 200 may notify the to-be-replaced active flight object of the destination after replacement.

Figure 7:
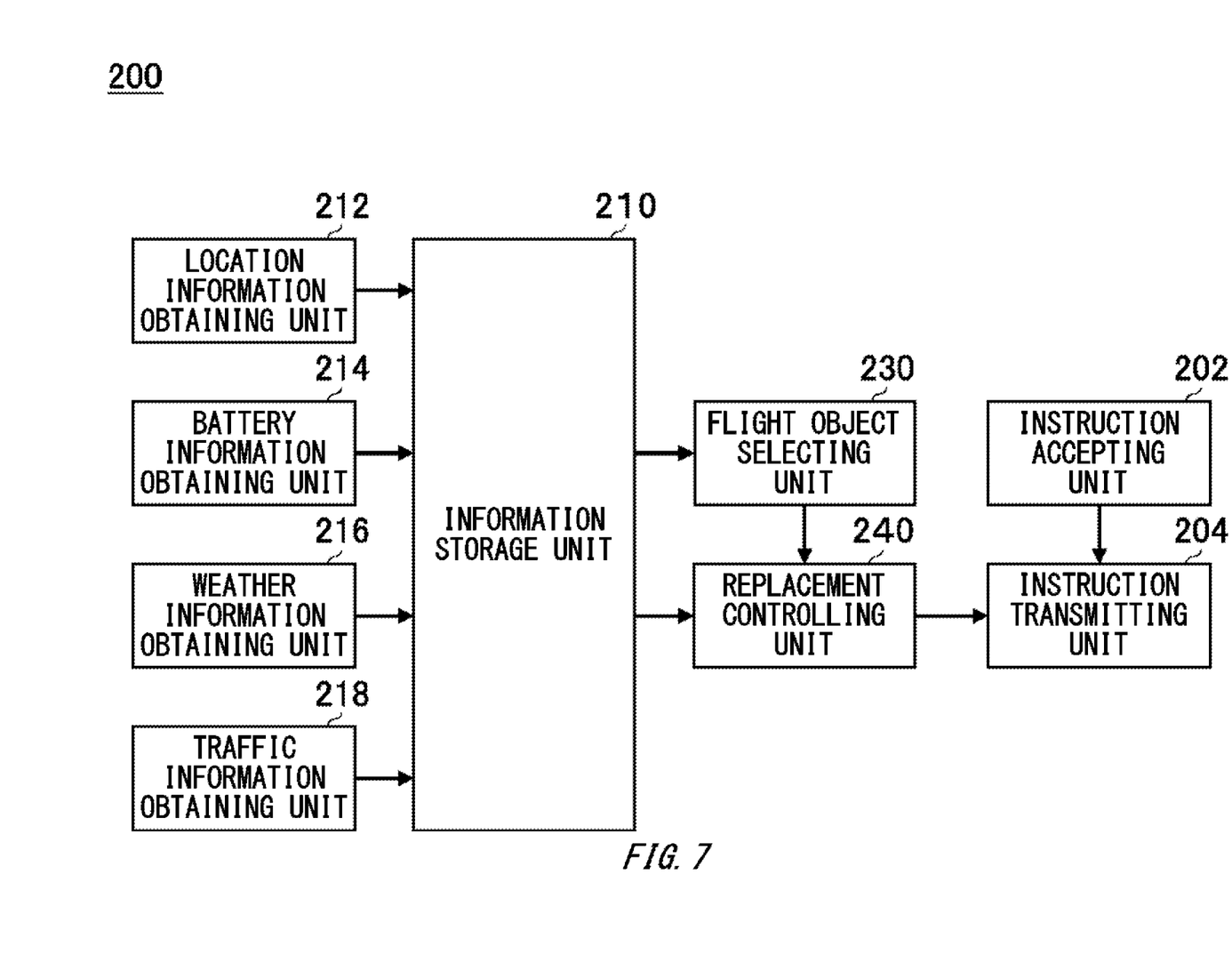
FIG. 7 is a schematic diagram of one example of a functional configuration of the control device 200.

FIG. 7 is a schematic diagram of one example of a functional configuration of the control device 200. The control device 200 includes an instruction accepting unit 202, an instruction transmitting unit 204, an information storage unit 210, a location information obtaining unit 212, a battery information obtaining unit 214, a weather information obtaining unit 216, a traffic information obtaining unit 218, a flight object selecting unit 230, and a replacement controlling unit 240.

The instruction accepting unit 202 accepts various types of instruction. The instruction accepting unit 202 accepts, for example, an instruction specifying the target area 40. The instruction accepting unit 202 also accepts, for example, an instruction specifying the flying mode of a plurality of flight objects 100. The instruction accepting unit 202 also accepts, for example, an instruction specifying the flight area of the standby flight object. The instruction accepting unit 202 may accept an instruction which is input via an operation unit included in the control device 200. The instruction accepting unit 202 may also accept via a communication unit included in the control device 200 an instruction which is received via the network 20.

The instruction transmitting unit 204 transmits, to the flight object 100, the instruction accepted by the instruction accepting unit 202. The instruction transmitting unit 204 may transmit the instruction to the plurality of flight objects 100. The instruction transmitting unit 204 may also transmit the instruction to one flight object 100 among the plurality of flight objects 100, and the one flight object 100 may transmit the instruction to another flight object 100.

The information storage unit 210 stores various types of information. The information storage unit 210 may store the information related to the configuration of each of the plurality of flight objects 100.

The location information obtaining unit 212 obtains the location information indicating the location of the plurality of flight objects 100. The location information obtaining unit 212 receives the location information measured by the GPS and the like from, for example, each of the plurality of flight objects 100. The location information obtaining unit 212 may store the obtained location information in the information storage unit 210.

The battery information obtaining unit 214 obtains the battery information indicating the battery condition for each of the plurality of flight objects 100. The battery information obtaining unit 214 may receive the battery information from each of the plurality of flight objects 100. The flight object 100 transmits, for example, the remaining battery level of the battery as the battery information to the control device 200. The flight object 100 also transmits the electric storage performance of the battery as the battery information to the control device 200. The electric storage performance of the battery may be detected by the flight object 100. The flight object 100 may use any known technique to detect the electric storage performance of the battery. The battery information obtaining unit 214 may store the obtained battery information in the information storage unit 210.

The weather information obtaining unit 216 obtains weather information in the flight area where each of the plurality of flight objects 100 is flying. The weather information may include a current weather situation in the flight area. The weather information may also include a weather forecast of the flight area. The weather information obtaining unit 216 may obtain the weather information from the weather information server 400. The weather information obtaining unit 216 may store the obtained weather information in the information storage unit 210.

The traffic information obtaining unit 218 obtains the traffic information indicating the communication traffic in the wireless communication service provided by each of the plurality of active flight objects for the user terminal 30. The traffic information obtaining unit 218 may obtain the traffic information from the communication management device 300. The traffic information obtaining unit 218 may store the obtained traffic information in the information storage unit 210.

The flight object selecting unit 230 selects the to-be-replaced active flight object from the plurality of active flight objects. The flight object selecting unit 230 may select the to-be-replaced active flight object from the plurality of active flight objects based on the various types of information stored in the information storage unit 210.

The flight object selecting unit 230 selects the to-be-replaced active flight object based on, for example, the battery information stored in the information storage unit 210. The flight object selecting unit 230 may preferentially select an active flight object with a low remaining battery level of the battery among the plurality of active flight objects as the to-be-replaced active flight object. The flight object selecting unit 230 may preferentially select an active flight object with more deteriorated electric storage performance of the battery among the plurality of active flight objects as the to-be-replaced active flight object.

The flight object selecting unit 230 also selects the to-be-replaced active flight object based on, for example, the weather information stored in the information storage unit 210. The flight object selecting unit 230 preferentially selects the active flight object which is flying in the flight area with the weather for which more electrical power is consumed among the plurality of active flight objects as the to-be-replaced active flight object.

The flight object selecting unit 230 also selects the to-be-replaced active flight object based on, for example, the traffic information stored in the information storage unit 210. The flight object selecting unit 230 preferentially selects the active flight object with higher communication traffic in the wireless communication service provided by the user terminal 30 among the plurality of active flight objects as the to-be-replaced active flight object.

The flight object selecting unit 230 may also select the to-be-replaced active flight object based on at least one of the battery information, weather information, and traffic information stored in the information storage unit 210. The flight object selecting unit 230 selects the to-be-replaced active flight object by, for example, weighting the battery information, weather information, and traffic information and using at least one of these pieces of information. The rule to determine the to-be-replaced active flight object based on a combination of the battery information, weather information, and traffic information may be predetermined. Such a rule may be stored in the information storage unit 210 in advance.

The flight object selecting unit 230 may also predict the replacement time limit of the active flight object based on the plurality of pieces of information stored in the information storage unit 210. For example, the flight object selecting unit 230 predicts the time period during which the remaining battery level of the battery of the active flight object is lower than the predetermined threshold based on the plurality of pieces of information stored in the information storage unit 210 and determines time period as the replacement time limit. The flight object selecting unit 230 may predict the battery consumption and charge amount of the active flight object based on the plurality of pieces of information stored in the information storage unit 210 and use the predicted battery consumption and charge amount to determine the replacement time limit.

Upon determining the replacement time limit, the flight object selecting unit 230 may select the active flight object with the earliest replacement time limit among the plurality of active flight objects as the to-be-replaced active flight object. For example, if there are a plurality of standby flight objects for the plurality of active flight objects, the flight object selecting unit 230 may select a plurality of active flight objects with earlier replacement time limits, the number of which corresponds to the number of the standby flight objects, among the plurality of active flight objects as the to-be-replaced active flight objects.

The replacement controlling unit 240 replaces the to-be-replaced active flight object selected by the flight object selecting unit 230 with the standby flight object. The replacement controlling unit 240 may instruct the standby flight object and the to-be-replaced active flight object to be replaced with each other by, for example, transmitting the identity information which identifies the to-be-replaced active flight object to the standby flight object and transmitting the identity information which identifies the standby flight object to the to-be-replaced active flight object. The replacement controlling unit 240 may also instruct the standby flight object and the to-be-replaced active flight object to be replaced with each other by transmitting the replacement location and the replacement time. For example, the replacement is achieved such that the standby flight object flies to reach the replacement location at the replacement time and the to-be-replaced active flight object goes away from the path along which it has been flying to cover the target area, at the replacement time.

The replacement controlling unit 240 may determine a replacement plan. The replacement controlling unit 240 determines the replacement plan including, for example, the replacement time period, the standby area in which the standby flight object is flying for a predetermined period until the replacement time period, and the flying manner in which the standby flight object moves toward the to-be-replaced active flight object when the replacement time period is reached.

For example, the replacement controlling unit 240 determines the area vertically above the to-be-replaced active flight object as the standby area. For example, the replacement controlling unit 240 also determines, as the flying manner, the flight path resulting in a longer time for gliding from the standby area to the to-be-replaced active flight object.

The replacement controlling unit 240 may determine the replacement time period based on the various types of information stored in the information storage unit 210. For example, the replacement controlling unit 240 determines the replacement time period based on at least any of the battery information, the weather information, and the traffic information stored in the information storage unit 210. If the replacement time limit has been determined by the flight object selecting unit 230, the replacement controlling unit 240 determines the replacement time period which is before the replacement time limit.

The replacement controlling unit 240 may determine, as the replacement time limit, the time period during which the communication traffic of the wireless communication service provided by the to-be-replaced active flight object for the user terminal 30 is relatively low. The time period during which the communication traffic is relatively low may be specified by an operator of the control device 200 and the like. For example, any time period during the nighttime may be specified. The replacement controlling unit 240 may also refer to the past traffic information stored in the information storage unit 210 and identify a date and time, a time of day, and the like during which the communication traffic is relatively low.

After replacing the to-be-replaced active flight object with the standby flight object, the replacement controlling unit 240 may determine whether to cause the to-be-replaced active flight object to standby while flying without forming the communication area 120, that is, operate as a standby flight object, or to move to the ground. Then, the replacement controlling unit 240 may control the active flight object which has replaced the standby flight object, according to the determined result. For example, upon determining that the to-be-replaced active flight object needs maintenance, the replacement controlling unit 240 determines to move the to-be-replaced active flight object to the ground, and otherwise determines to operate it as a standby flight object. The replacement controlling unit 240 determines that the to-be-replaced active flight object needs maintenance when, for example, the electric storage performance of the battery of the to-be-replaced active flight object is lower than the predetermined performance.

Figure 8:
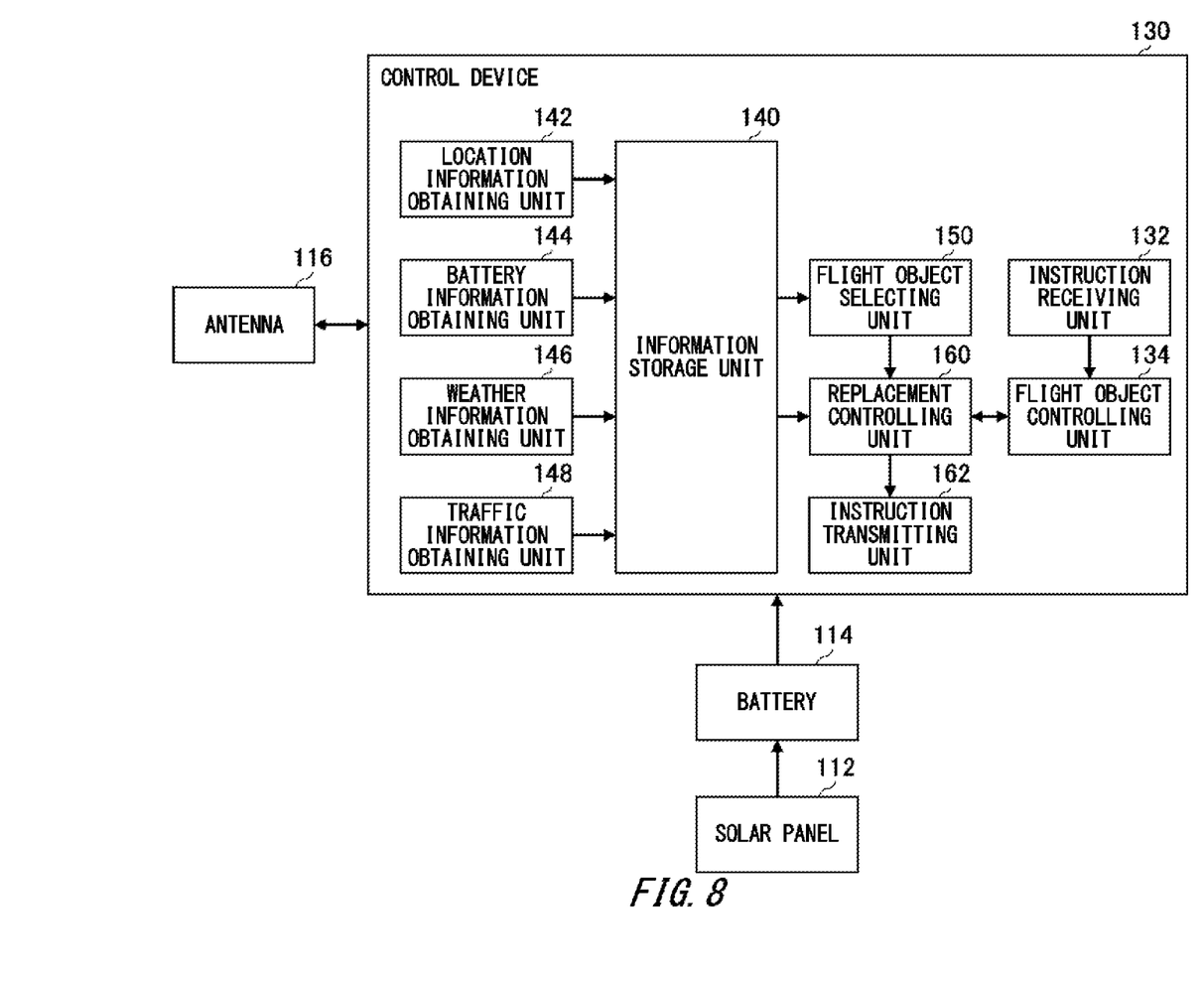
FIG. 8 is a schematic diagram of one example of a functional configuration of a control device 130 included in the flight object 100.

FIG. 8 is a schematic diagram of one example of a functional configuration of the control device 130 included in the flight object 100. The control device 130 includes an instruction receiving unit 132, a flight object controlling unit 134, an information storage unit 140, a location information obtaining unit 142, a battery information obtaining unit 144, a weather information obtaining unit 146, a traffic information obtaining unit 148, a flight object selecting unit 150, a replacement controlling unit 160, and an instruction transmitting unit 162. Here, the difference from the control device 200 will be mainly described.

The control device 130 performs various types of control using electrical power generated by the solar panel 112 and stored in the battery 114. The control device 130 may also use the electrical power stored in the battery 114 to control the antenna 116 to form the communication area 120, communicate with the control device 200, and communicate with another flight object 100.

The instruction receiving unit 132 receives various types of instruction. The instruction receiving unit 132 receives instruction which is, for example, transmitted by the control device 200. The instruction receiving unit 132 also receives the instruction which is transmitted by the control device 130 of another flight object 100.

The flight object controlling unit 134 controls the flight of the flight object 100 and the formation of the communication area 120. The flight object controlling unit 134 may control the flight of the flight object 100 and the formation of the communication area 120 according to the instruction received by the instruction receiving unit 132.

The information storage unit 140 stores various types of information. The information storage unit 140 may store the information related to the configuration of each of the plurality of flight objects 100.

The location information obtaining unit 142 obtains the location information indicating the location of the plurality of flight objects 100. The location information obtaining unit 142 obtains, as the location information of the flight object 100 (sometimes referred to as "associated flight object") on which the control device 130 is mounted, the location information measured by the flight object 100 using the GPS and the like. The location information obtaining unit 142 may also receive the location information measured with the GPS and the like from each of the plurality of flight objects 100. The location information obtaining unit 142 may store the obtained location information in the information storage unit 140.

The battery information obtaining unit 144 obtains the battery information indicating the battery condition for each of the plurality of flight objects 100. The battery information obtaining unit 144 may receive the battery information from each of the plurality of flight objects 100. The battery information obtaining unit 144 may obtain the battery information of the associated flight object by referring to the remaining battery level of the battery of the associated flight object. The flight object 100 may monitor the change in the electric storage performance of the battery of the associated flight object. The battery information obtaining unit 144 may obtain the battery information of the associated flight object by referring to the change in the electric storage performance monitored by the flight object 100. The battery information obtaining unit 144 may store the obtained battery information in the information storage unit 140.

The weather information obtaining unit 146 obtains the weather information of the flight area where each of the plurality of flight objects 100 including the associated flight object is flying. The weather information obtaining unit 146 may obtain the weather information from the weather information server 400. The weather information obtaining unit 146 may store the obtained weather information in the information storage unit 140.

The traffic information obtaining unit 148 obtains traffic information indicating the communication traffic in the wireless communication service provided by each of the plurality of active flight objects including the associated flight object for the user terminal 30. The traffic information obtaining unit 148 may obtain the traffic information from the communication management device 300. The traffic information obtaining unit 148 may store the obtained traffic information in the information storage unit 140.

The flight object selecting unit 150 selects a to-be-replaced active flight object among the plurality of active flight objects. The flight object selecting unit 150 may select the to-be-replaced active flight object from the plurality of active flight objects based on the various types of information stored in the information storage unit 140.

The flight object selecting unit 150 selects the to-be-replaced active flight object based on, for example, the battery information stored in the information storage unit 140. The flight object selecting unit 150 also selects the to-be-replaced active flight object based on, for example, the weather information stored in the information storage unit 140. The flight object selecting unit 150 also selects the to-be-replaced active flight object based on, for example, the traffic information stored in the information storage unit 140. The flight object selecting unit 150 may also select the to-be-replaced active flight object based on at least one of the battery information, weather information, and traffic information stored in the information storage unit 140.

The flight object selecting unit 150 may also predict the replacement time limit of the active flight object based on the plurality of pieces of information stored in the information storage unit 140. Upon predicting the replacement time limit, the flight object selecting unit 150 may select the active flight object with the earliest replacement time limit among the plurality of active flight objects as the to-be-replaced active flight object. For example, if there is plurality of standby flight objects for the plurality of active flight objects, the flight object selecting unit 150 may select the plurality of active flight objects with earlier replacement time limits among the plurality of active flight objects as the to-be-replaced active flight object.

The replacement controlling unit 160 replaces the to-be-replaced active flight object selected by the flight object selecting unit 150 with the standby flight object. The replacement controlling unit 160 may instruct the standby flight object and the to-be-replaced active flight object to be replaced with each other by, for example, transmitting via the instruction transmitting unit 162 the identity information which identifies the to-be-replaced active flight object to the standby flight object and transmitting the identity information which identifies the standby flight object to the to-be-replaced active flight object. The replacement controlling unit 160 may also instruct the standby flight object and the to-be-replaced active flight object to be replaced with each other by transmitting via the instruction transmitting unit 162 the replacement location and the replacement time.

The replacement controlling unit 160 may determine the replacement plan. The replacement controlling unit 160 determines the replacement plan including, for example, the replacement time period, the standby area in which the standby flight object is flying for a predetermined period until the replacement time period, and the flying manner in which the standby flight object moves toward the to-be-replaced active flight object when the replacement time period is reached.

For example, the replacement controlling unit 160 determines the area vertically above the to-be-replaced active flight object as the standby area. For example, the replacement controlling unit 160 also determines, as the flying manner, the flight path resulting in a longer time for gliding from the standby area to the to-be-replaced active flight object.

The replacement controlling unit 160 may determine the replacement time period based on the various types of information stored in the information storage unit 140. For example, the replacement controlling unit 160 determines the replacement time period based on at least any of the battery information, the weather information, and the traffic information stored in the information storage unit 140. If the replacement time limit has been determined by the flight object selecting unit 150, the replacement controlling unit 160 determines the replacement time period which is before the replacement time limit. The replacement controlling unit 160 may determine, as the replacement time period, the time period during which the communication traffic of the wireless communication service provided by the to-be-replaced active flight object for the user terminal 30 is relatively low.

After replacing the to-be-replaced active flight object with the standby flight object, the replacement controlling unit 160 may determine whether to cause the to-be-replaced active flight object to standby while flying without forming the communication area 120, that is, operate as a standby flight object, or to move to the ground. Then, the replacement controlling unit 160 may control the active flight object which has replaced the standby flight object, according to the determined result. For example, upon determining that the to-be-replaced active flight object needs maintenance, the replacement controlling unit 160 determines to move the to-be-replaced active flight object to the ground, and otherwise determines to operate it as a standby flight object. The replacement controlling unit 160 determines that the to-be-replaced active flight object needs maintenance when, for example, the electric storage performance of the battery of the to-be-replaced active flight object is lower than the predetermined performance.

Upon selecting the associated flight object as the to-be-replaced active flight object, the replacement controlling unit 160 may cause the flight object controlling unit 134 to perform the control so that the associated flight object is replaced with the standby flight object. When the associated flight object is the standby flight object, the replacement controlling unit 160 may cause the flight object controlling unit 134 to perform the control so that the to-be-replaced active flight object is replaced with the associated flight object.

Figure 9:
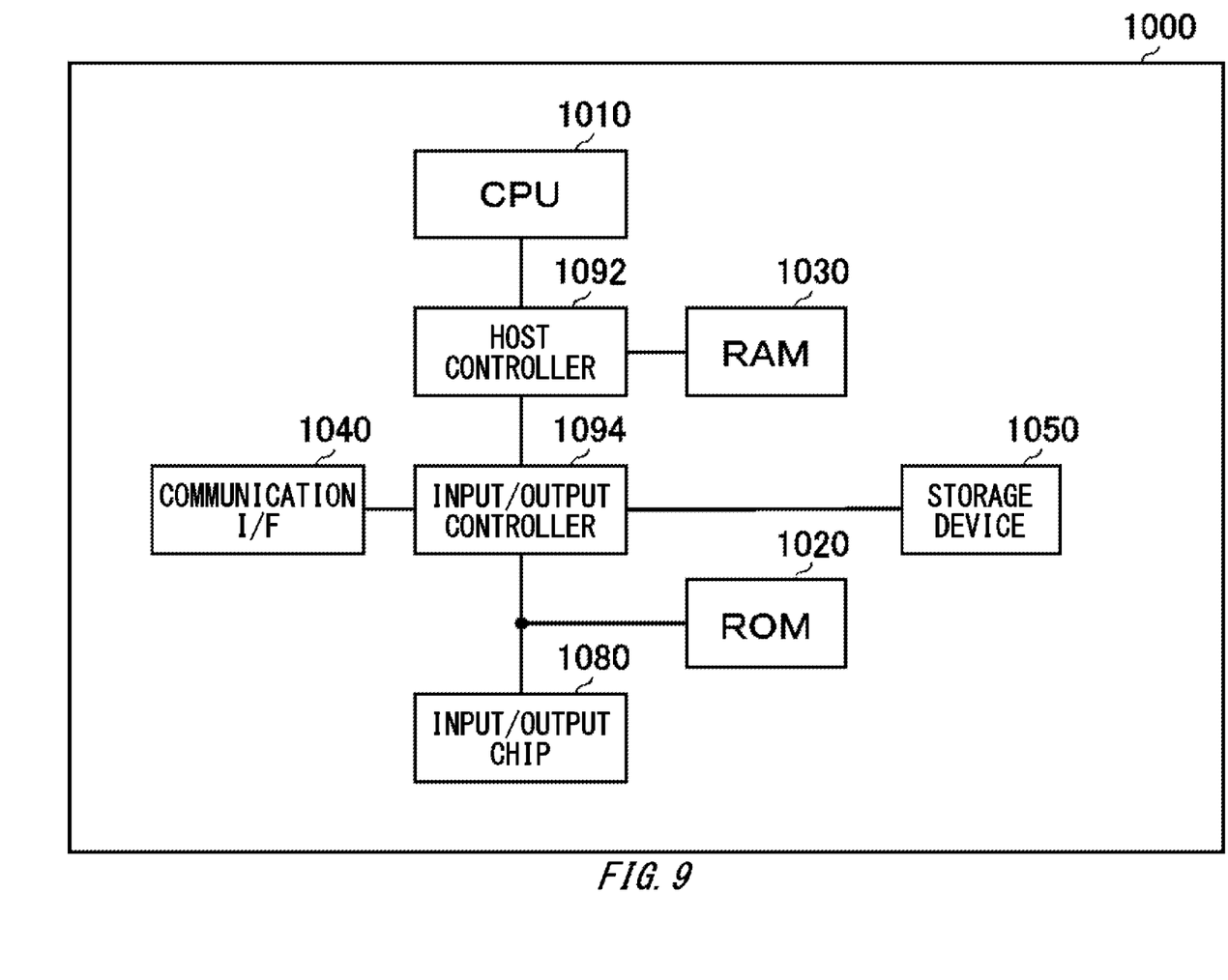
FIG. 9 is a schematic diagram of one example of a configuration of hardware of the computer 1000 which functions as the control device 130 or the control device 200.

FIG. 9 is a schematic diagram of one example of a computer 1000 functioning as the control device 200 or the control device 130. The computer 1000 according to the present embodiment includes a CPU-surrounding section including a CPU 1010 and a RAM 1030 connected with each other by a host controller 1092, and a input/output section including a ROM 1020, a communication I/F 1040, a storage device 1050, and a input/output chip 1080 which are connected with a host controller 1092 by an input/output controller 1094.

The CPU 1010 operates based on programs stored in the ROM 1020 and the RAM 1030 to control each section. The communication I/F 1040 communicates with another apparatus via the network. The communication I/F 1040 also functions as the hardware performing the communication. The storage device 1050 may be a hard disk drive, a solid state disk, a solid state drive, and the like, and stores the program and data used by the CPU 1010.

The ROM 1020 stores a boot program executed by the computer 1000 at startup, programs dependent on hardware of the computer 1000, and the like. The input/output chip 1080 connects various types of input/output apparatus to the input/output controller 1094 via, for example, a USB port, a parallel port, a serial port, a keyboard port, a mouse port, and the like.

Programs provided to the storage device 1050 via the RAM 1030 are provided by a user in a form stored in a recording medium such as an IC card. The programs are read out from the recording medium, installed onto the storage device 1050 via the RAM 1030, and executed on the CPU 1010.

The programs installed onto the computer 1000 for causing the computer 1000 to function as the control device 200 or the control device 130 may instruct the CPU 1010 or the like to cause the computer 1000 to function as each section of the control device 200 or the control device 130. The information processing described in these program is read by the computer 1000 to function as the instruction accepting unit 202, the instruction transmitting unit 204, the information storage unit 210, the location information obtaining unit 212, the battery information obtaining unit 214, the weather information obtaining unit 216, the traffic information obtaining unit 218, the flight object selecting unit 230, and the replacement controlling unit 240, which are the specific means in which the software and the various types of hardware resource described above cooperate. The information processing described in these program is also read by the computer 1000 to function as the instruction receiving unit 132, the flight object controlling unit 134, the information storage unit 140, the location information obtaining unit 142, the battery information obtaining unit 144, the weather information obtaining unit 146, the traffic information obtaining unit 148, the flight object selecting unit 150, and the replacement controlling unit 160, which are the specific means in which the software and the various types of hardware resource described above cooperate. These specific means implement operations or processings of information according to the intended use of the computer 1000 in the present embodiment, and the control device 200 or the control device 130 is thereby constructed to be specific for the intended use.

While the embodiments of the present invention have been described, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 constellation system
20 network
22 gateway
30 user terminal
40 target area
50 control facility 60 control tower
62 management region
70 communications satellite
80 standby area
100 flight object
102 body portion
104 main wing portion
106 propeller
108 skid
110 wheel
112 solar panel
114 battery
116 antenna
120 communication area
122 cell
130 control device
132 instruction receiving unit
134 flight object controlling unit
140 information storage unit
142 location information obtaining unit
144 battery information obtaining unit
146 weather information obtaining unit
148 traffic information obtaining unit
150 flight object selecting unit
160 replacement controlling unit
162 instruction transmitting unit
200 control device
202 instruction accepting unit
204 instruction transmitting unit
210 information storage unit
212 location information obtaining unit
214 battery information obtaining unit
216 weather information obtaining unit
218 traffic information obtaining unit
230 flight object selecting unit
240 replacement controlling unit
300 communication management device
400 weather information server
1000 computer
1010 CPU
1020 ROM
1030 RAM
1040 communication I/F
1050 storage device
1080 input/output chip
1092 host controller
1094 input/output controller

What is claimed is:

1. A control device configured to control a plurality of flight objects having a solar panel, a battery for storing an electrical power generated by the solar panel, and an antenna for forming a communication area on a ground with the electrical power stored in the battery and providing a wireless communication service for a user terminal within the communication area, the control device comprising:
 a flight object selecting unit configured to select a to-be-replaced active flight object among a plurality of active flight objects, which are flight objects each flying while covering a target area with the communication area; and
 a replacement controlling unit configured to replace the to-be-replaced active flight object with a standby flight object which is a flight object flying without forming the communication area, wherein
  the standby flight object flies at a higher altitude than the to-be-replaced active flight object, and
  the replacement controlling unit is configured to move the standby flight object toward the to-be-replaced active flight object with a flying manner with which the standby flight object glides for a longer time than the to-be-replaced active flight object, and then replace the to-be-replaced active flight object with the standby flight object.

2. The control device according to claim 1, wherein the replacement controlling unit is configured to determine a replacement time period during which the to-be-replaced active flight object is replaced with the standby flight object, and then replace the to-be-replaced active flight object with the standby flight object during the replacement time period.

3. The control device according to claim 2, wherein the replacement controlling unit is configured to determine the replacement time period based on at least any of a battery condition of the to-be-replaced active flight object, weather in a flight area in which the to-be-replaced active flight object is flying, and a communication traffic in a wireless communication service provided by the to-be-replaced active flight object for the user terminal.

4. The control device according to claim 2, wherein the replacement controlling unit is configured to move the standby flight object toward a flight area which is a location corresponding to a flight area of the to-be-replaced active flight object, before the replacement time period.

5. The control device according to claim 2, wherein the replacement controlling unit is configured to determine, as the replacement time period, a time period during which a communication traffic of a wireless communication service provided by the to-be-replaced active flight object for the user terminal is relatively low.

6. The control device according to claim 5, wherein the replacement time period is a nighttime.

7. The control device according to claim 1, wherein the replacement controlling unit is configured to determine, after replacing the to-be-replaced active flight object with the standby flight object, whether to cause the to-be-replaced active flight object to standby while flying without forming the communication area or move the to-be-replaced active flight object to a ground, and then control the active flight object which is replaced with the standby flight object according to a determined result.

8. The control device according to claim 1, comprising a battery information obtaining unit which is configured to obtain battery information indicating a battery condition of each of the plurality of active flight objects, wherein
 the flight object selecting unit is configured to select the to-be-replaced active flight object based on the battery information.

9. The control device according to claim 8, wherein the battery information includes at least any of a remaining battery level of the battery and an electric storage performance of the battery.

10. The control device according to claim 9, wherein the flight object selecting unit is configured to preferentially select an active flight object with lower remaining battery level of the battery among the plurality of active flight objects as the to-be-replaced active flight object.

11. The control device according to claim 9, wherein the flight object selecting unit is configured to preferentially select an active flight object with a more deteriorated electric storage performance of the battery among the plurality of active flight objects as the to-be-replaced active flight object.

12. The control device according to claim 1, comprising a weather Information obtaining unit which is configured to obtain weather information of a flight area in which each of the plurality of active flight objects is flying, wherein the flight object selecting unit is configured to select the to-be-replaced active flight object based on the weather information.

13. The control device according to claim 12, wherein the flight object selecting unit is configured to preferentially select an active flight object flying in a flight area with weather for which more electrical power is consumed among the plurality of active flight objects as the to-be-replaced active flight object.

14. The control device according to claim 1, comprising a traffic information obtaining unit which is configured to obtain traffic information indicating a communication traffic in a wireless communication service provided by each of the plurality of active flight objects, wherein the flight object selecting unit is configured to select the to-be-replaced active flight object based on the traffic information.

15. The control device according to claim 14, wherein the flight object selecting unit is configured to preferentially select an active flight object with more communication traffic in a provided wireless communication service among the plurality of active flight objects as the to-be-replaced active flight object.

16. The control device according to claim 1, wherein the flight object selecting unit is configured to determine a replacement time limit for each of the plurality of active flight objects based on at least any of a battery condition of the plurality of active flight objects, weather in a flight area in which each of the plurality of active flight objects is flying, and a communication traffic in a wireless communication service provided by each of the plurality of active flight objects for the user terminal.

17. The control device according to claim 16, wherein the flight object selecting unit is configured to select a flight object with an earlier replacement time limit among the plurality of active flight objects as the to-be-replaced active flight object.

18. The control device according to claim 1, wherein the replacement controlling unit is further configured to increase the battery charge amount of the standby flight object.

19. The control device according to claim 1, wherein the replacement controlling unit is further configured to increase the electrical charge amount of the standby flight object by tilting the body of the standby flight object to increase the amount of light received from the sun, the angle of the tilt from the tilting greater than an angle of tilt possible from tilting the body of the active flight object while the active flight object forms the communication area.

20. A non-transitory computer-readable storage medium having a computer program recorded thereon configured to operate a computer to control a plurality of flight objects having a solar panel, a battery for storing an electrical power generated by the solar panel, and an antenna for forming a communication area on a ground with the electrical power stored in the battery and providing a wireless communication service for a user terminal within the communication area to function as:

a flight object selecting unit configured to select a to-be-replaced active flight object among a plurality of active flight objects, which are flight objects each flying while covering a target area with the communication area; and a replacement controlling unit configured to replace the to-be-replaced active flight object with a standby flight object which is a flight object flying at a higher altitude than the to-be-replaced active flight object without forming the communication area, wherein the replacement controlling unit is configured to move the standby flight object toward the to-be-replaced active flight object with a flying manner with which the standby flight object glides for a longer time than the to-be-replaced active flight object, and then replace the to-be-replaced active flight object with the standby flight object.

21. A control method for controlling a plurality of flight objects having a solar panel, a battery for storing an electrical power generated by the solar panel, and an antenna for forming a communication area on a ground with the electrical power stored in the battery and providing a wireless communication service for a user terminal within the communication area, the control method comprising:

selecting a to-be-replaced active flight object among a plurality of active flight objects, which are flight objects each flying while covering a target area with the communication area; and replacing the to-be-replaced active flight object with a standby flight object, which is a flight object flying without forming the communication area, wherein the standby flight object flies at a higher altitude than the to-be-replaced active flight object, and in the replacing, the standby flight object is moved toward the to-be-replaced active flight object with a flying manner with which the standby flight object glides for a longer time than the to-be-replaced active flight object, and then the to-be-replaced active flight object is replaced with the standby flight object.

22. A control device configured to control a plurality of flight objects having a solar panel, a battery for storing an electrical power generated by the solar panel, and an antenna for forming a communication area on a ground with the electrical power stored in the battery and providing a wireless communication service for a user terminal within the communication area, the control device comprising:

a flight object selecting unit configured to select a to-be-replaced active flight object among a plurality of active flight objects, which are flight objects each flying while covering a target area with the communication area; and a replacement controlling unit configured to replace the to-be-replaced active flight object with a standby flight object which is a flight object flying without forming the communication area, wherein the standby flight object flies at a higher altitude than the to-be-replaced active flight object, the replacement controlling unit is configured to move the standby flight object toward the to-be-replaced active flight object with a flying manner with which the standby flight object glides for a longer time than the to-be-replaced active flight object, and then replace the to-be-replaced active flight object with the standby flight object; and the replacement controlling unit is configured to increase the battery charge amount of the standby flight object.

* * * * *